(12) United States Patent
Purdy et al.

(10) Patent No.: US 7,100,081 B1
(45) Date of Patent: Aug. 29, 2006

(54) METHOD AND APPARATUS FOR FAULT CLASSIFICATION BASED ON RESIDUAL VECTORS

(75) Inventors: Matthew A. Purdy, Austin, TX (US); Robert J. Chong, Austin, TX (US); Gregory A. Cherry, Austin, TX (US); Richard J. Markle, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 550 days.

(21) Appl. No.: 10/682,019

(22) Filed: Oct. 9, 2003

(51) Int. Cl.
G06F 11/00 (2006.01)
G06F 19/00 (2006.01)
(52) U.S. Cl. .......................... 714/25; 702/34
(58) Field of Classification Search ................ 714/25, 714/26, 37, 57; 702/185
See application file for complete search history.

(56) References Cited

U.S. PATENT DOCUMENTS

| | | | |
|---|---|---|---|
| 6,014,598 A * | 1/2000 | Duyar et al. ................. 701/29 |
| 6,549,863 B1 * | 4/2003 | Morinaga ..................... 702/81 |
| 6,594,589 B1 * | 7/2003 | Coss et al. .................... 702/34 |
| 6,757,621 B1 * | 6/2004 | Mizuno et al. ............... 702/35 |
| 6,912,433 B1 * | 6/2005 | Chong et al. ............... 700/110 |
| 6,917,839 B1 * | 7/2005 | Bickford ..................... 700/30 |
| 6,991,945 B1 * | 1/2006 | Castle et al. ................. 438/14 |
| 7,043,403 B1 * | 5/2006 | Wang et al. ................ 702/185 |

OTHER PUBLICATIONS

Wu, et al; Fault Detection and Classification of Plasma CVD tool; 2003; pp. 123-125.

* cited by examiner

*Primary Examiner*—Nadeem Iqbal
(74) *Attorney, Agent, or Firm*—Williams, Morgan & Amerson

(57) ABSTRACT

A method includes receiving a current residual vector. The current residual vector is compared to a plurality of historical residual vectors. Each historical residual vector has an associated fault classification code. At least one of the historical residual vectors is selected responsive to determining that the current residual vector matches at least one of the historical residual vectors. A fault condition is classified based on the fault classification code associated with the selected historical residual vector.

42 Claims, 3 Drawing Sheets

METHOD AND APPARATUS FOR FAULT CLASSIFICATION BASED ON RESIDUAL VECTORS

BACKGROUND OF THE INVENTION

1. Field of the Invention

This invention relates generally to the field of fault classification in an industrial process and, more particularly, to a method and apparatus for fault classification based on residual vectors.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

Semiconductor devices are manufactured from wafers of a semiconducting material. Layers of materials are added, removed, and/or treated during fabrication to create the electrical circuits that make up the device. The fabrication essentially comprises four basic operations. Although there are only four basic operations, they can be combined in hundreds of different ways, depending upon the particular fabrication process.

The four operations typically used in the manufacture of semiconductor devices are:

- layering, or adding thin layers of various materials to a wafer from which a semiconductor device is produced;
- patterning, or removing selected portions of added layers;
- doping, or placing specific amounts of dopants in the wafer surface through openings in the added layers; and
- heat treatment, or heating and cooling the materials to produce desired effects in the processed wafer.

Occasionally, during the fabrication process, one or more process steps are not performed as expected on a production wafer. Such conditions may be due to an error in the fabrication facility automated work flow system (e.g., a database or control script error), a tool failure, or an operator error. If the abnormal process steps occur early during the fabrication process, it is not uncommon for the faulty wafer to undergo many subsequent steps prior to the faulty fabrication being identified. Once a fault is identified further processing is often necessary to determine the nature or cause of the fault, unless the fault is grossly obvious. This process is typically referred to as fault classification. Fault classification may be time consuming and may require significant human intervention. Improved fault classification increases the response time for correcting defect conditions.

The present invention is directed to overcoming, or at least reducing the effects of, one or more of the problems set forth above.

SUMMARY OF THE INVENTION

One aspect of the present invention is seen in a method that includes receiving a current residual vector. The current residual vector is compared to a plurality of historical residual vectors. Each historical residual vector has an associated fault classification code. At least one of the historical residual vectors is selected responsive to determining that the current residual vector matches at least one of the historical residual vectors. A fault condition is classified based on the fault classification code associated with the selected historical residual vector.

Another aspect of the present invention is seen in a system including a fault detection unit adapted to generate a current residual vector and a fault classification unit. The fault classification unit is adapted to receive the current residual vector, compare the current residual vector to a plurality of historical residual vectors, each historical residual vector having an associated fault classification code, select at least one of the historical residual vectors responsive to determining that the current residual vector matches at least one of the historical residual vectors, and classify a fault condition based on the fault classification code associated with the selected historical residual vector.

BRIEF DESCRIPTION OF THE DRAWINGS

The invention may be understood by reference to the following description taken in conjunction with the accompanying drawings, in which like reference numerals identify like elements, and in which.

Figure 1:
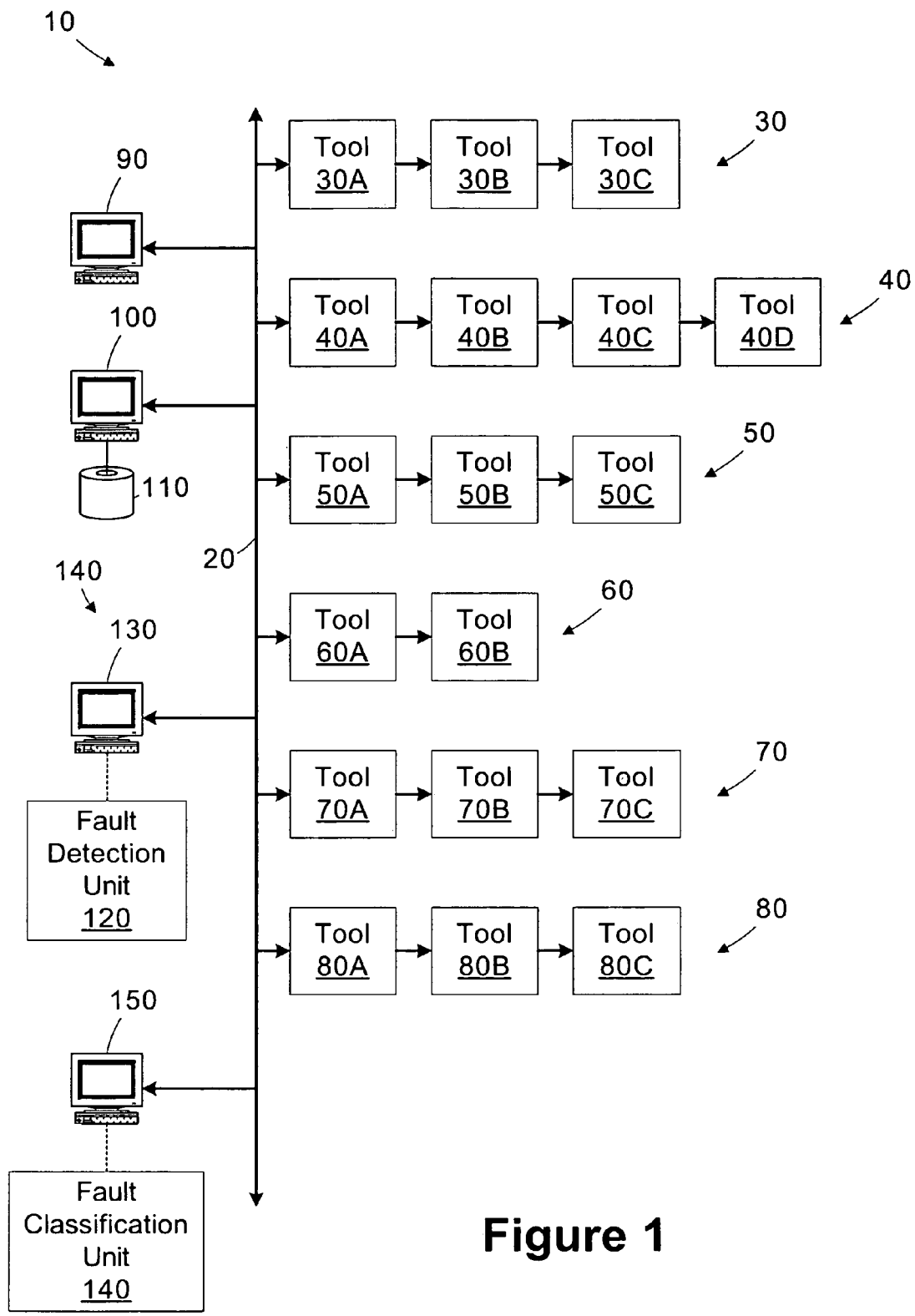
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools 30–80 may be arranged in any physical order or grouping. Additionally, the connections between the tools in a particular grouping are meant to represent connections to the network 20, rather than interconnections between the tools 30–80.

A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, etc.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The process control server 90 stores information related to the particular tools 30–80 (i.e., or sensors (not shown) associated with the tools 30–80) used to process each lot of wafers in the data store 110. As metrology data is collected related to the lot, the metrology data and a tool identifier indicating the identity of the metrology tool recording the measurements is also stored in the data store 110. The metrology data may include feature measurements, process layer thicknesses, electrical performance, surface profiles, etc. Data stored for the tools 30–80 may include chamber pressure, chamber temperature, anneal time, implant dose, implant energy, plasma energy, processing time, etc. Data associated with the operating recipe settings used by the tool 30–80 during the fabrication process may also be stored in the data store 110. For example, it may not be possible to measure direct values for some process parameters. These settings may be determined from the operating recipe in lieu of actual process data from the tool 30–80.

The manufacturing system 10 includes a fault detection unit 120 executing on a workstation 130 and a fault classification unit 140 executing on a workstation 150. In general, the fault detection unit 120 identifies fault conditions in the manufacturing system 10 and the fault classification unit 140 classifies the identified faults based on residual vectors associated with the processing of an associated wafer or lot of wafers. The residual vectors are compared to a library of historical residual vectors, and fault conditions are classified based on the comparison.

The distribution of the processing and data storage functions amongst the different computers 90, 100, 130, 150 is generally conducted to provide independence and a central information store. Of course, different numbers of computers and different arrangements may be used. Moreover, the functions of some units may be combined. For example, the fault detection and classification units 120, 140 may be combined into a single unit.

In general, the fault detection unit 120 is a model-based, multivariate fault detection analysis engine. The construct and operation of such fault detection tools are known to those of ordinary skill in the art. An exemplary commercially available fault detection engine is ModelWare™ offered by Triant, Inc. of Nanaimo, British Columbia, Canada Vancouver, Canada. The fault detection unit 120 typically predicts values for various characteristics of the processing tool and/or processed wafer, compares the expected data with actual data collected by the tools 30–80 (i.e., or sensors associated with the tools 30–80) and by metrology tools that measure electrical or physical characteristics of the processed wafers, and identifies defects based on the differences therebetween. For clarity and to prevent obscuring the present invention, the fault detection unit 120 is not discussed in greater detail herein.

The fault classification unit 140, either constructs a residual vector or receives the residual vector from the fault detection unit 120. A residual vector relates the difference between the expected values and actual values for various characteristics evaluated by the fault detection unit 120 in identifying the fault condition.

$$\vec{S}_{residual} = \vec{S}_{actual} - \vec{S}_{expected} \tag{1}$$

The particular parameters included in the residual vector may vary widely depending on the nature of the fault detection unit 120, the type of fault being detected and classified, the data collection capabilities of the tools 30–80 or sensors, and the types of metrology data collected. Data in the residual vector may be based on metrology data (e.g. site level thicknesses), sensor trace data (pressure, temperature, gas flow rate), summary statistics at different aggregations (mean pressure by lot/wafer/recipe/step), or a combination of any of the above. The application of the present invention is not limited to any particular selection of parameters in the residual vector.

In one example, the residual vector may include temperature, pressure, and mass flow rate data for a fabrication process performed by one of the tools 30–80.

$$\begin{bmatrix} Temp_{residual} \\ P_{residual} \\ MFR_{residual} \end{bmatrix} = \begin{bmatrix} Temp_{actual} \\ P_{actual} \\ MFR_{actual} \end{bmatrix} - \begin{bmatrix} Temp_{expected} \\ P_{expected} \\ MFR_{expected} \end{bmatrix} \tag{2}$$

The fault classification unit 140 uses the residual vector to identify each type of fault classification. Each fault type typically results in a characteristic response in the values (e.g., tool or metrology data) being used as inputs to the fault detection algorithm. The individual components of the residual vector are determined for each fault analysis application.

Each existing fault classification record represented by a historical residual vector has an associated fault classification code. For example, when the cause of a fault condition is identified (e.g., tool fault X), a fault classification code is associated in the data store 110 with the residual vector generated when the fault was detected. If the fault classification unit 140 matches a current residual vector with a historical residual vector, the fault classification for the current wafer may be inferred by the fault classification code associated with the matched historical residual vector. If the fault classification unit 140 fails to match a current residual vector with a historical residual vector, a new fault classification code may be initiated. Human intervention may be necessary to assign a meaning to the new fault classification code after the fault condition is diagnosed.

In some embodiments, the residual vector may be preprocessed. For example, in some cases, the same fault type may be indicated with different degrees of intensity (e.g., a small shift in temperature or a large shift in temperature). The residual vector may be preprocessed by normalizing the vector wherein the length of the vector is adjusted so that it equals one.

$$\vec{S}_{residual} = \frac{\vec{S}_{residual}}{|\vec{S}_{residual}|}. \tag{3}$$

However, in some cases, normalizing may not be desired. For instance, if different fault types have similar residual vectors, differing only in magnitude, normalizing would not be performed. It is contemplated that the fault classification engine may operate multiple times on the same residual vector, with or without preprocessing to classify a fault condition.

Once the residual vector has been preprocessed (if desired), the fault classification unit 140 compares it to other historical vectors/data points that have been stored in a database (e.g., the data store 110. In a first embodiment the fault classification unit 140 calculates the distance between the ends of the vectors. One technique for calculating the distance is to calculate the distance between two points in space using the following equation:

$$D = \sqrt{\sum_{i=1}^{n} (S_{1i} - S_{2i})^2}, \tag{4}$$

where:
D is the distance between the new and stored data points;
S represents the data for a vector/data point. S1 is the new data point. S2 is the stored data point;
i refers to an index into the sensors (e.g., 1 may mean Temperature, 2 may mean Pressure, etc. . . . ); and
n refers to the number of sensors/values in each vector/data point.

If the distance between the new vector/data point and the stored vector/data point is less than a predefined tolerance, then the fault described by the new data point can be considered to be of the same classification as the stored data point. The distance technique may be used whether or not the residual vector is normalized.

A second technique for determining the distance between the current residual vector and a historical residual vector involves calculating the distance between the two data points along the surface of the unit structure around the origin (e.g., the distance following the curve of the circle/sphere instead of following a chord through the circle/sphere). This technique is employed with normalized residual vectors. Although this technique is adapted for use with normalized vectors, either technique should identify the same closest historical residual vector.

The second distance technique is performed by projecting the current residual vector onto the historical residual vector to which it is being compared. This projection is done by calculating the scalar (dot) product of the vectors.

$$P = \vec{S}_1 \cdot \vec{S}_2 \tag{5}$$

where,
$\vec{S}_1$ is the new vector;

$\vec{S}_2$ is the historical residual vector; and

P is the projection of the new vector onto the stored vector.

If the new vector is normalized, the value of P is between −1 and 1 due to the previous normalization of the vectors to unit length. A value for P of 1 indicates that vectors $\vec{S}_1$ and $\vec{S}_2$ are identical, and a value of −1 means that they are exactly opposite. In this embodiment, a match threshold may be set at 0.9 for example.

If the new vector is not normalized, there are no bounds on the value of P. This situation may be addressed by scaling P by the magnitude of the larger vector.

$$P = \frac{\vec{S}_1 \cdot \vec{S}_2}{\max(|\vec{S}_1|, |\vec{S}_2|)} \tag{6}$$

In this case, the value of P is still unbounded, but a perfect match of the current residual vector to the historical residual vector is now scaled to a value of one.

Figure 2:
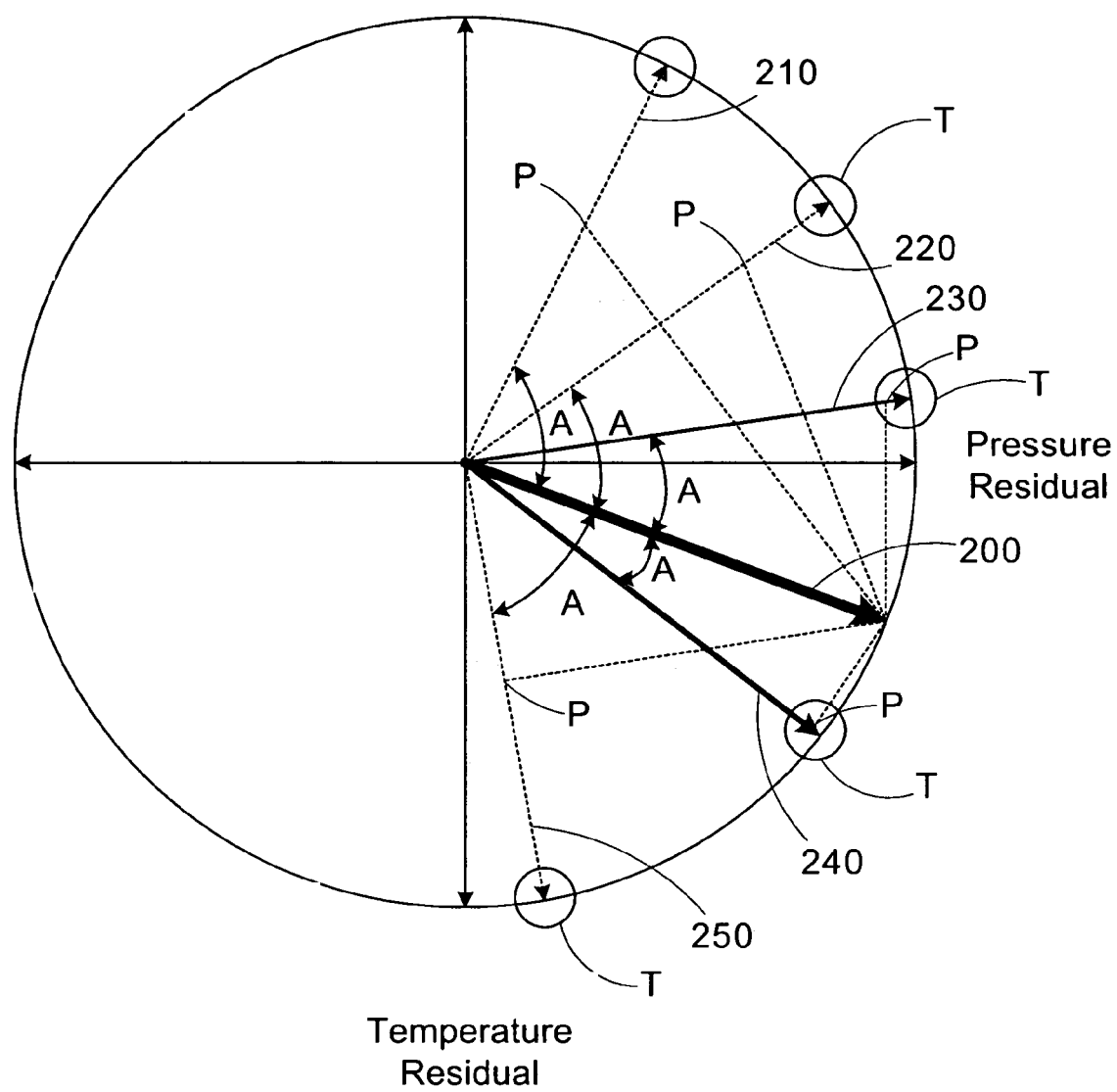
FIG. 2 is a graph illustrating the comparison between a current residual vector and historical residual vectors.

FIG. 2 is a graph illustrating the comparison between a current residual vector 200 and historical residual vectors 210–250. In the example of FIG. 2, the current residual vector 200 includes a temperature parameter and a pressure parameter. The fault classification unit 140 compares the current residual vector 200 to all historical residual vectors 210–250 of the appropriate type (e.g., same tool, recipe, etc.). The circles T represent the detection threshold (e.g., 0.9) and the values P represent the projection values (i.e., distance from origin of unit circle forth projection). If P lies within the threshold T for a given historical residual vector 210–250 a match is identified. The fault classification unit 140 identifies the historical residual vector 240 as the closest to the current residual vector 200 and identifies the fault classification associated with the vector 240 as the most likely fault classification for the current residual vector 200. In the illustrated example, the historical residual vector 230 is also within the predetermined matching threshold, but not as close to the current residual vector 200 as the vector 240. The fault classification unit 140 identifies the historical residual vector 230 as a possible fault classification match. Hence, the fault classification unit 140 identifies a most likely fault classification and possible one or more possible fault classifications for the current residual vector 200 based on the comparisons with the historical residual vectors 210–250.

A third technique for determining the distance between a current residual vector 200 and a historical residual vector 210–250 is determining, an angle, A, between the current residual vector 200 and the historical residual vectors 210–250. If the angular distance, defined by the angle, A, is less than a predetermined threshold, a match condition may be identified.

If the current residual vector 200 is not within the comparison limits of any historical residual vector 210–250 stored previously, the current residual vector 200 may be used to define a new classification of fault. The value of the comparison limit may be generated through manual or automatic analysis of historical data, real-time data, or a manual threshold.

If the current residual vector 200 matches one of the historical residual vectors 210–250, the historical residual vector (e.g., 240) that describes the fault classification type may be updated. The new historical residual vector may be normalized prior to being stored in the data store 110, as described above. In some embodiments, prior to updating the historical residual vector, manual input indicating that the current residual vector does indeed match the fault classification associated with the historical residual vector may be provided. When a new residual vector is determined to be of the same type as a historical residual vector, the historical residual vector may be updated by adding the current residual vector 200 as part of a weighted average:

$$\vec{S}_{new} = \frac{n\vec{S}_{old} + \vec{S}}{n+1}, \tag{7}$$

where, $\vec{S}_{new}$ represents the new historical residual vector;

$\vec{S}_{old}$ represents the old historical residual vector;

$\vec{S}$ represents the current residual vector 200 being used to update the historical residual vector; and n is the number of data points that have contributed to old historical residual vector.

Alternatively, the historical residual vector may be updated using an exponentially weighted moving average (EWMA).

$$\vec{S}_{new} = \lambda \vec{S}_{old} + (1-\lambda)\vec{S} \tag{8}$$

where λ is the EWMA weighting factor having a value between 0 and 1.

In some embodiments, the fault classification unit 140 may not update the historical residual vector based on the current residual vector. For example, the historical residual vectors may be generated through known actions, such as experiment intentionally run to induce fault conditions and record their response. In such cases, the historical residual vectors may not be updated.

The fault classification unit 140 may employ two types of data records—classification model records and fault type records. The classification model record stores information about the group of stored historical residual vectors for a particular process context (e.g., tool recipe). This record includes a descriptor that may be used to ensure that vectors being compared to stored vectors contain the same elements as the stored vectors. Also, information as to whether or not the stored vectors are normalized, whether they should be updated, etc. may be stored in this record. The fault records store information about an individual fault class and are used to communicate results. Examples of the type of information that might appear in the fault type record would be a list of fault occurrences as well information about how the faults were remedied.

In another embodiment, the fault classification unit 140 may be adapted to predict fault conditions prior to them being detected by the fault detection unit 120. In this embodiment, the fault detection unit 120 provides the fault classification unit 140 with residual vectors that have not been identified as representing a fault condition. The fault classification unit 140 matches the residual vectors to the historical residual vectors to determine if a trend exists whereby they are getting closer to one or more of the historical residual vectors. By identifying such trends, the fault classification unit 140 may predict a fault condition prior to it being identified by the fault detection unit 120.

The fault classification unit 140 may identify one or more potential fault conditions based on which historical residual vectors the trend seems to be approaching. Predicting the fault conditions may allow a corrective action to be implemented prior to the production of faulty devices that require rework or are scrapped.

Figure 3:
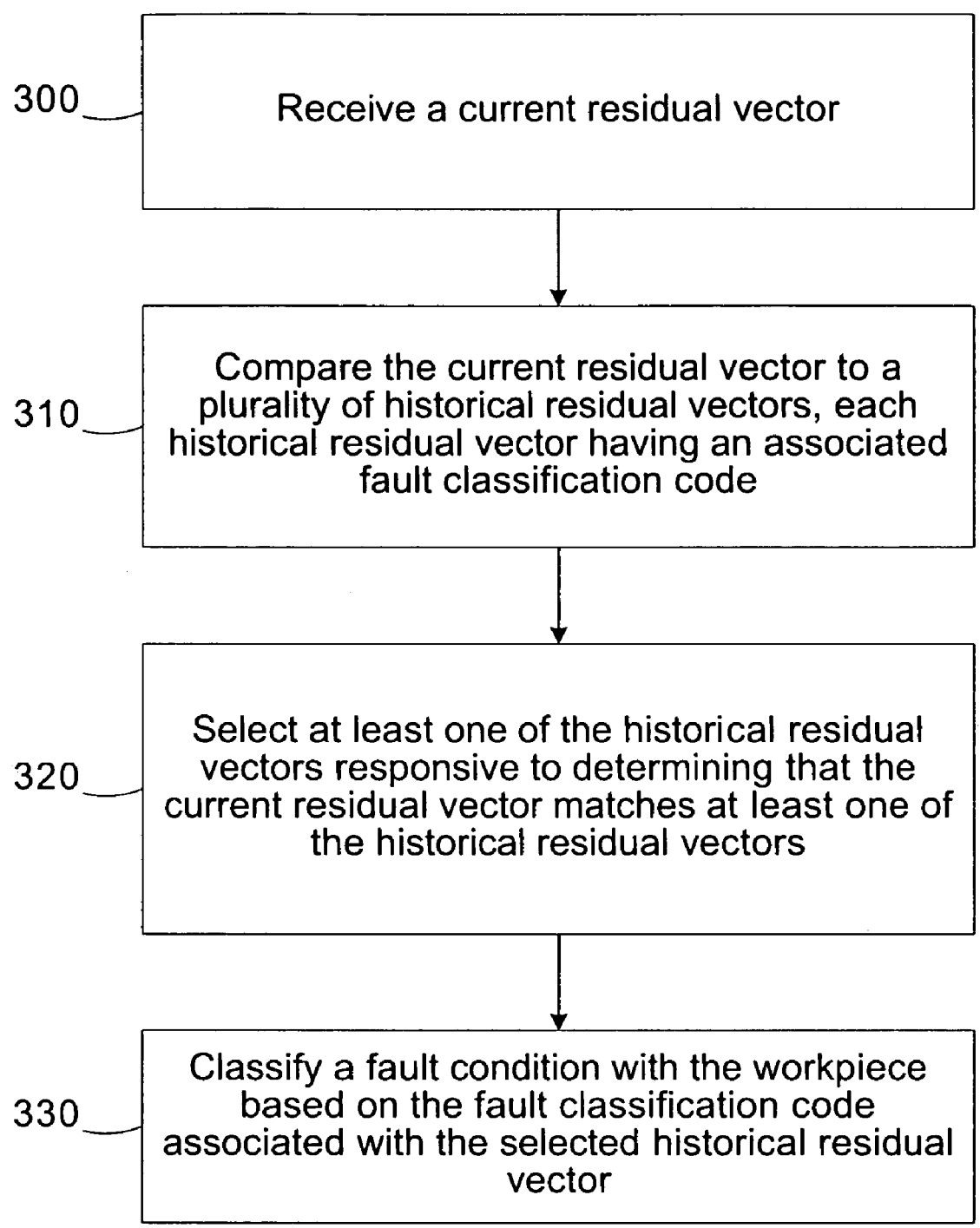
FIG. 3 is a simplified flow diagram of a method for classifying faults based on residual vectors in accordance with another illustrative embodiment of the present invention.

Turning now to FIG. 3, a simplified flow diagram of a method for classifying faults based on residual vectors in accordance with another illustrative embodiment of the present invention is shown. In block 300, a current residual vector is received. In block 310, the current residual vector is compared to a plurality of historical residual vectors. Each historical residual vector has an associated fault classification code. In block 320, at least one of the historical residual vectors is selected responsive to determining that the current residual vector matches at least one of the historical residual vectors. In block 330, the fault condition is classified based on the fault classification code associated with the selected historical residual vector.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving a current residual vector;
   comparing the current residual vector to a plurality of historical residual vectors, each historical residual vector having an associated fault classification code;
   selecting at least one of the historical residual vectors responsive to determining that the current residual vector matches at least one of the historical residual vectors; and
   classifying a fault condition based on the fault classification code associated with the selected historical residual vector.

2. The method of claim 1, further comprising generating the current residual vector.

3. The method of claim 2, wherein generating the current residual vector further comprises:
   determining expected values for a set of parameters;
   determining actual values for the set of parameters; and
   subtracting the actual values from the expected values to generate residual values for the set of parameters; and
   generating the current residual vector based on the residual values for the set of parameters.

4. The method of claim 3, wherein determining the expected values for the set of parameters further comprises determining expected values for at least one tool parameter associated with a tool for processing a workpiece.

5. The method of claim 3, wherein determining the expected values for the set of parameters further comprises determining expected values for at least one characteristic of a workpiece.

6. The method of claim 3, wherein determining the expected values for the set of parameters further comprises determining expected values for at least one tool parameter associated with a tool for processing a workpiece and at least one characteristic of the workpiece.

7. The method of claim 1, wherein comparing the current residual vector to the plurality of historical residual vectors further comprises determining a distance between the current residual vector and the plurality of historical residual vectors, and determining that the current residual vector matches at least one of the historical residual vectors further comprises determining that the distance is less than a predetermined threshold.

8. The method of claim 7, wherein determining the distance further comprises determining a distance between ends of the current residual vector and ends of the historical residual vectors.

9. The method of claim 7, wherein determining the distance further comprises projecting the current residual vector onto the historical residual vectors.

10. The method of claim 9, wherein projecting the current residual vector comprises determining a scalar product of the current residual vector and the historical residual vectors.

11. The method of claim 7, wherein determining the distance, further comprises determining an angle between the current residual vector and each of the historical residual vectors.

12. The method of claim 1, further comprising normalizing the current residual vector prior to comparing the current residual vector to the plurality of historical residual vectors.

13. The method of claim 1, further comprising:
   determining that the current residual vector does not match any of the historical residual vectors; and
   generating a new historical residual vector based on the current residual vector.

14. The method of claim 13, further comprising determining a fault classification code for the new historical residual vector.

15. The method of claim 1, further comprising scaling the current residual vector based on the larger of the current residual vector and the historical residual vector to which the current residual vector is being compared.

16. The method of claim 1, further comprising updating the selected historical residual vector based on the current residual vector.

17. The method of claim 16, wherein updating the selected historical residual vector further comprises averaging the selected historical residual vector and the current residual vector based on a weighted average.

18. The method of claim 16, wherein updating the selected historical residual vector further comprises averaging the selected historical residual vector and the current residual vector based on an exponentially weighted average.

19. The method of claim 1, further comprising:
   selecting a plurality of historical residual vectors responsive to determining that the current residual vector matches the plurality of historical residual vectors; and
   identifying one of the selected plurality of historical residual vectors as a most likely match to the current residual vector.

20. The method of claim 19, further comprising identifying remaining ones of the plurality of historical residual vectors as possible matches to the current residual vector.

21. The method of claim 1, further comprising:
   receiving a plurality of current residual vectors;
   comparing the plurality of current residual vectors to the plurality of historical residual vectors;
   identifying a trend in the current residual vectors approaching at least one of the plurality of historical residual vectors; and
   identifying a potential condition responsive to identifying the trend.

22. A system, comprising:
a fault detection unit adapted to generate a current residual vector; and
a fault classification unit adapted to receive the current residual vector, compare the current residual vector to a plurality of historical residual vectors, each historical residual vector having an associated fault classification code, select at least one of the historical residual vectors responsive to determining that the current residual vector matches at least one of the historical residual vectors, and classify a fault condition based on the fault classification code associated with the selected historical residual vector.

23. The system of claim 22, wherein the current residual vector comprises residual values for a set of parameters generated by subtracting actual values for the set of parameters from expected values for the set of parameters.

24. The system of claim 23, wherein the set of parameters further comprises at least one tool parameter associated with a tool for processing a workpiece.

25. The system of claim 23, wherein the set of parameters further comprises at least one characteristic of a workpiece.

26. The system of claim 23, wherein the set of parameters further comprises at least one tool parameter associated with a tool for processing a workpiece and at least one characteristic of the workpiece.

27. The system of claim 22, wherein the fault classification unit is further adapted to determine a distance between the current residual vector and the plurality of historical residual vectors and determine if the distance is less than a predetermined threshold to determine if the current residual vector matches at least one of the historical residual vectors.

28. The system of claim 27, wherein the fault classification unit is further adapted to determine a distance between ends of the current residual vector and ends of the historical residual vectors.

29. The system of claim 27, wherein the fault classification unit is further adapted to project the current residual vector onto the historical residual vectors.

30. The system of claim 29, wherein the fault classification unit is further adapted to determine a scalar product of the current residual vector and the historical residual vectors.

31. The system of claim 27, wherein the fault classification unit is further adapted to determine an angle between the current residual vector and each of the historical residual vectors.

32. The system of claim 22, wherein the fault classification unit is further adapted to normalize the current residual vector prior to comparing the current residual vector to the plurality of historical residual vectors.

33. The system of claim 22, wherein the fault classification unit is further adapted to generate a new historical residual vector based on the current residual vector responsive to determining that the current residual vector does not match any of the historical residual vectors.

34. The system of claim 33, wherein the fault classification unit is further adapted to associated a fault classification code with the new historical residual vector.

35. The system of claim 22, wherein the fault classification unit is further adapted to scale the current residual vector based on the larger of the current residual vector and the historical residual vector to which the current residual vector is being compared.

36. The system of claim 22, wherein the fault classification unit is further adapted to update the selected historical residual vector based on the current residual vector.

37. The system of claim 36, wherein the fault classification unit is further adapted to average the selected historical residual vector and the current residual vector based on a weighted average.

38. The system of claim 36, wherein the fault classification unit is further adapted to average the selected historical residual vector and the current residual vector based on an exponentially weighted average.

39. The system of claim 22, wherein the fault classification unit is further adapted to select a plurality of historical residual vectors responsive to determining that the current residual vector matches the plurality of historical residual vectors and identify one of the selected plurality of historical residual vectors as a most likely match to the current residual vector.

40. The system of claim 39, wherein the fault classification unit is further adapted to identify remaining ones of the plurality of historical residual vectors as possible matches to the current residual vector.

41. The system of claim 21, wherein the fault detection unit is further adapted to generate a plurality of current residual vectors, and the fault classification unit is further adapted to compare the plurality of current residual vectors to the plurality of historical residual vectors, identify a trend in the current residual vectors approaching at least one of the plurality of historical residual vectors, and identify a potential fault condition responsive to identifying the trend.

42. A system, comprising:
means for receiving a current residual vector;
means for comparing the current residual vector to a plurality of historical residual vectors, each historical residual vector having an associated fault classification code;
means for selecting at least one of the historical residual vectors responsive to determining that the current residual vector matches at least one of the historical residual vectors; and
means for classifying the fault condition based on the fault classification code associated with the selected historical residual vector.

* * * * *